United States Patent [19]

Swearingen

[11] Patent Number: 4,606,652
[45] Date of Patent: Aug. 19, 1986

[54] SHAFT SEAL FOR TURBOMACHINERY
[75] Inventor: Judson S. Swearingen, Malibu, Calif.
[73] Assignee: Rotoflow, Corporation, Los Angeles, Calif.
[21] Appl. No.: 622,703
[22] Filed: Jun. 20, 1984
[51] Int. Cl.$^4$ ............... F16C 33/72; F01M 9/00
[52] U.S. Cl. .................... 384/130; 60/657; 277/3; 277/15; 277/29; 415/168; 415/175
[58] Field of Search ............ 415/110, 111, 112, 168, 415/169 R, 169 A, 175; 277/3, 15, 27, 29, 53; 384/480, 99, 130, 307, 144, 398, 477, 479; 60/657, 646; 184/6

[56] References Cited
U.S. PATENT DOCUMENTS 3,171,354  3/1965  Sohlemann ............... 415/175 X
3,420,434  1/1969  Swearingen ............... 415/168 X
3,670,850  6/1972  Swearingen ............... 277/15 X
3,831,381  8/1974  Swearingen ............... 277/15 X
3,937,022  2/1976  Swearingen ............... 60/657
4,005,580  1/1977  Swearingen ............... 60/657

Primary Examiner—Stuart S. Levy
Assistant Examiner—David Werner
Attorney, Agent, or Firm—Lyon & Lyon

[57] ABSTRACT

A cryogenic turboexpander employing a rotor and a shaft fixed thereto including bearings rotatably supporting the shaft having a pressurized lubricating system. A labyrinth seal is positioned between the bearings and the rotor. A control valve is employed to sense differential pressure across a portion of the seal and regulate the pressure within a cavity between the seal and a near bearing.

8 Claims, 1 Drawing Figure

U.S. Patent    Aug. 19, 1986    4,606,652
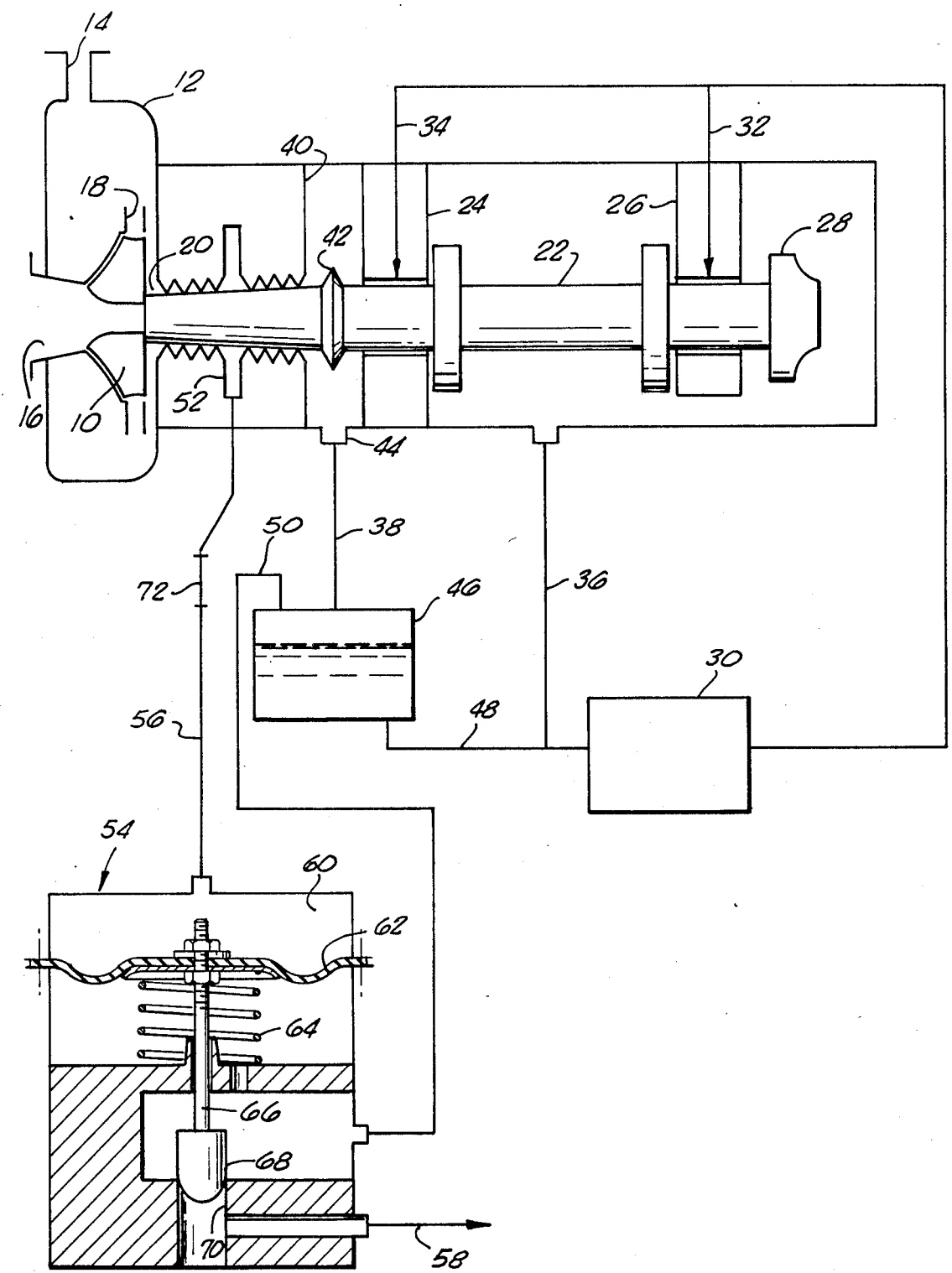

SHAFT SEAL FOR TURBOMACHINERY

BACKGROUND OF THE INVENTION

The field of the present invention is sealing mechanisms for a rotating shaft having bearings which are pressure lubricated.

In industrial turbomachinery including turbines, turboexpanders, compressors and the like, a high speed rotor is often employed which is supported by a rotatably mounted shaft. The shaft is in turn mounted in bearings. Such bearings often include a pressurized lubricant system delivering a large amount of lubricating fluids to the bearings. At the same time, working fluid may be pressurized near the shaft such that there is a tendency for that fluid to flow along the shaft toward the pressurized bearings and for the pressurized lubricant to flow toward the rotor cavity and mix with the working fluid. However, contamination of the working fluid by the lubricant is often disadvantageous and can in fact be disastrous to the system.

A number of solutions of varying success have been proposed as a means for creating an adequate seal between the working fluid in the rotor cavity and the lubricant in the pressurized bearing. A simple labyrinth seal for such a device arranged on a tapered portion of the shaft is illustrated in U.S. Pat. No. 4,287,758, the disclosure of which is incorporated herein by reference. The labyrinth seal provides a series of ridges closely approaching the shaft and intermediate channels which are found to substantially reduce the amount of flow therethrough. The tapered arrangement of the shaft provides centrifugal forces tending to direct material within the labyrinth seal toward the bearing.

Additional devices for sealing such a shaft have employed drains and open areas between the bearing and the seal. One such device is illustrated in U.S. Pat. No. 3,360,239, the disclosure of which is incorporated herein by reference. In that patent, a chamber is fully exposed to atmosphere with a separate bearing seal also employed.

An additional mechanism for avoiding contamination of the working fluid is to provide pressurized gas to the seal such that the gas pressure maintains a pressure barrier against flow of lubricant toward the rotor end of the shaft. One such system employing compressed gas as a seal gas is illustrated in U.S. Pat. No. 3,420,434, the disclosure of which is incorporated herein by reference.

The foregoing arrangements for sealing a shaft have several possible objections. A seal gas source and the system for delivering same is required. Additionally, the seal leakage of such systems may be excessive. A third difficulty can be that the seal gas leaks into the process stream and dilutes the working fluid. A pressure upset in such a seal depending on pressure differentials may result in oil being swept into the working fluid before an appropriate response can be taken. The seal gas flow may also be restricted or in some way cut off such that the sealing cannot be fully effected.

SUMMARY OF THE INVENTION

The present invention pertains to the creation of a seal between the lubricated bearings of a rotating shaft and the working fluid of turbomachinery. The foregoing is accomplished with relatively low pressure differentials, without a separate source of seal gas. The present invention also is responsive to pressure anomalies across the seal and may itself provide a short term source of sealing pressure for emergency purposes. The foregoing features are realized through the employment of a control valve mechanism responsive to differential pressure across a portion of the sealing means. Overpressure on the bearing side of the seal may be quickly reduced to avoid contamination of the working fluid. Excessive pressure on the working fluid side of the seal relative to the bearing side may be accommodated through an increase in pressure on the bearing side of the seal. Thus, excessive flow of working fluid is avoided. The actuating mechanism additionally can operate as a pump for a single stroke to supply gas to the seal if working fluid pressure is suddenly reduced. The relatively low pressure differentials under steady state conditions control thermal losses from the working fluid through the seal.

Accordingly, it is a principal object of the present invention to provide an improved seal mechanism for the shaft of turbomachinery. Other and further objects and advantages will appear hereinafter.

BRIEF DESCRIPTION OF THE DRAWING

The Figure schematically illustrates a system of the present invention with the control valve illustrated in cross section for clarity.

DETAILED DESCRIPTION OF THE PREFERRED EMBODIMENT

Turning in detail to the drawing, a cryogenic turboexpander is schematically illustrated employing the shaft seal of the present invention. A turbine wheel 10 is shown to be arranged within a housing 12 having an inlet 14 and an outlet 16. Pressurized flow is directed through the inlet 14, a nozzle area 18, the turbine 10 and the outlet 16 in seriatim. Pressure within the housing 12 may be allowed to communicate with the area behind the turbine wheel 10 at 20 to provide pressure thereto.

The device includes a shaft 22 fixed to the turbine wheel 10. The shaft is rotatably mounted within bearings 24 and 26. A power absorbing device 28 is affixed to the other end of the shaft 22 and may comprise, for example, an oil agitator, an air fan, a generator, a compressor, or other such device.

A lubricant system is provided for directing pressurized lubricant at the bearings 24 and 26. Pressurized lubricant is provided from the lubricating system 30 through passageways 32 and 34. Exhausted lubricant is collected through passageways 36 and 38 and returned to the system for recirculation.

A portion of the shaft 22 adjacent the rotor 10 is tapered and includes a labyrinth seal 40. The labyrinth seal 40 is positioned between the bearing 24 and the source of pressurized working fluid at 20. A collar 42 inertially directs lubricant away from the labyrinth seal 40.

In a similar manner to a conventionally pressurized seal, an outlet 44 is provided between the bearing 24 and the labyrinth seal 40 which is discharged through the passageway 38 to a chamber 46. The chamber 46 allows separation of the lubricant from sealing gases with an outlet passageway 48 from the bottom of the chamber 46 returning to the lubricant system and a passageway 50 from the upper end of the chamber directing sealing gases from the chamber 46. An annular groove 52 is arranged intermediate the ends of the labyrinth seal 40. Such an intermediate annular groove has been previously employed on pressurized gas sealing systems, acting as a distribution mechanism for pressurized fluids supplied thereto.

The foregoing description of the turbomachinery, the bearings, the labyrinth seal and the like is consistent with conventional practice. With this system, a control valve, generally designated 54, is novelly employed. The control valve 54 is in fluid communication with the annular groove 52 by means of a passageway 56. The passageway 50 provides communication to the control valve 54 from the chamber 46. An outlet from the valve is provided through a passageway 58.

The control valve itself includes a first chamber 60 divided by a diaphragm 62. The diaphragm 62 includes a first side in communication with the annular groove 52. A second side of the diaphragm 62 is placed in communication with the chamber 46 and in turn the outlet 44. A spring 64 provides a means for biasing the diaphragm 62 in the direction of the first side, i.e., upwardly in the Figure. A valve stem 66 is coupled with the diaphragm 62 to move therewith. A valve element 68 is in turn fixed to the valve stem 66 and is arranged to control flow through a vent outlet 70 to the outlet passage 58. The valve element 68 specifically controls communication between the vent outlet 70 and the chamber 46. The valve element 68 may also be structured in association with the vent outlet to provide a nonlinear relationship between valve displacement and flow rate therethrough. It is advantageous to provide a low rate of flow for initial valve openings for normal control purposes. High flow for emergency situations is also desired for larger valve openings.

The communication between the control valve 54 and the annular groove 52 is designed to be of working fluid. To determine if lubricant is inappropriately reaching the annular groove 52, a transparent section 72 in the passageway 56 may be used for monitoring of the effectiveness of the seal. The working gases which are accumulated within the chamber 60 above the diaphragm 62 may also provide a return source of pressurized fluid to maintain the seal upon substantial reduction in the pressure at 20. The size of the diaphragm 62 and its displacement may be sufficiently large to provide pressurized working fluid to the annular groove 52 during such an occurrence. Considering the amount of leakage through the labyrinth seal 40 and the length of time for which pressure is desired, the volume of diaphragm displacement may be selected through diaphragm area and stroke to accomplish the foregoing.

Turning then to the operation of the unit, the control valve 54 and the diaphragm 62 is effectively located for system purposes between the annular groove 52 and the outlet 44. Thus, pressure differential across a portion of the labyrinth seal 40 is sensed and employed for operation of the control valve 54. The spring 64 biases the control valve 54 and the diaphragm 62 toward the annular groove side of the seal. Consequently, pressure within the annular groove 52 must exceed that at the outlet 44 in order to balance not only the pressure at the outlet 44 but also the force of the spring 64. As a result, the spring force provided by the spring 64 determines the equilibrium values for the pressure differential across the seal.

When working fluid enters the seal 40 at 20, pressure is developed within the annular groove 52 to force the diaphragm 62 downwardly to close the valve. Working fluid also continues through the seal 40 past the annular groove 52 into the outlet chamber 46. Lubricant from the bearing 24 is also mixed with that working fluid at the outlet 44 which flows into the chamber 46. Because a seal is provided between the annular groove 52 and the outlet 44, a pressure differential exists when there is fluid flow. Consequently, pressures are established on either side of the diaphragm 62 within the chamber 60. As pressure increases at the outlet 44, the diaphragm 62 moves upwardly to slowly release that pressure through the vent outlet 70. In this way, a positive differential is created and maintained across the seal 40 to insure against lubricant flow into the working fluid.

If, for some reason, the bearing side of the seal 40 is overpressurized, the diaphragm 62 will immediately react and substantially raise the valve for rapid flow to the outlet. It is advantageous to employ a valve having a non-linear relationship between displacement and flow such that maximum flow can be accommodated with an anomalous overpressure situation.

A similar result is achieved if the working fluid pressure quickly drops. Under such circumstances, the control valve 54 again sees a pressure differential across the seal 40 in the wrong direction. Consequently, the valve is opened to restore equilibrium. The action of the control valve 54 under such circumstances results in the upward displacement of the diaphram 62. This upward displacement acts as a pump for directing control fluid to the annular groove 52. As the outlet 54 is vented and gas is supplied to the control groove 52, a positive pressure differential across the seal 40 is once again established. Naturally, the diaphragm displacement cannot continue to supply pressurized fluid to the annular groove 52. However, an advantageous pressure differential may be established for a period while shut down occurs. Sensing devices may be conventionally employed to initiate shutdown.

Under steady state conditions, a relatively small pressure differential may be maintained across the labyrinth seal 40 from the annular groove 52 to the outlet 44. As all flow of working fluid must pass fully through the labyrinth seal 40 under such conditions, the overall pressure differential between the entrance to the labyrinth seal at 20 and the outlet 44 also remains relatively small. This may be accommodated through an elevated pressure at the outlet 44 as controlled by the control valve 54 over atmospheric pressure to approach the working gas pressure. With a small pressure differential across the labyrinth seal 40, working fluid flow through the restriction of the labyrinth seal is maintained at a low level. With a cryogenic turboexpander, thermal loss from the flow of working fluid could become significant. However, the low level of flow under proper steady state conditions simply displaces the temperature gradient along the shaft with only a small additional thermal loss. Thus, through proper selection of the spring 64, the thermal effects of the seal may be minimized.

Thus, an improved shaft seal is disclosed to establish and maintain an advantageous pressure differential across a labyrinth seal. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A shaft seal for turbomachinery having a rotatably mounted shaft, a pressure lubricated bearing supporting said shaft and pressurized working fluid, comprising a labyrinth seal between the bearing and the source of pressurized working fluid and about the shaft, said labyrinth seal having an annular groove intermediate the ends of said labyrinth seal;

an outlet between the bearing and said labyrinth seal; and a control valve including a diaphragm, a first side of said diaphragm being in pressure communication with said annular groove and a second side of said diaphragm being in pressure communication with said outlet, bias means for biasing said diaphragm in the direction of said first side and a valve controlled by said diaphragm to selectively vent said outlet.

2. The shaft seal of claim 1 wherein said bias means includes a spring extending between said control valve and said diaphragm.

3. The shaft seal of claim 1 wherein the displacement of said diaphragm is large relative to the volume of said annular groove.

4. The shaft seal of claim 1 further comprising a passageway from said annular groove to said control valve, at least a portion of which is transparent.

5. A shaft seal for turbomachinery having a rotatably mounted shaft, a pressure lubricated bearing supporting said shaft and pressurized working fluid, comprising a labyrinth seal between the bearing and the source of pressurized working fluid and about the shaft, said labyrinth seal having an annular groove;

an outlet between the bearing and said labyrinth seal;

a control valve including a diaphragm, a first side of said diaphragm being in pressure communication with said annular groove and a second side of said diaphragm being in pressure communication with said outlet, a spring biasing said diaphragm in the direction of said first side and a valve controlled by said diaphragm and to selectively vent said outlet; and a chamber intermediate said outlet and said control valve for accumulating lubricant and working fluid and including an inlet passageway from said outlet and an outlet passageway between said chamber and said control valve, said outlet passageway being at the upper end of said chamber to vent working fluid from said chamber.

6. A shaft seal for turbomachinery having a rotatably mounted shaft, a pressure lubricated bearing supporting said shaft and pressurized working fluid, comprising a labyrinth seal between the bearing and the source of pressurized working fluid and about the shaft, said labyrinth seal having an annular groove intermediate the ends of said labyrinth seal;

an outlet between the bearing and said labyrinth seal; and a control valve including a diaphragm, a first side of said diaphragm being in pressure communication with said annular groove and a second side of said diaphragm being in pressure communication with said outlet, bias means for biasing said diaphragm in the direction of said first side and a valve controlled by said diaphragm to selectively vent said outlet, said outlet including a chamber for collecting effluent from between said bearing and said labyrinth seal and a passageway extending from the upper end of said chamber to said control valve.

7. A shaft seal for turbomachinery having a rotatably mounted shaft, a pressure lubricated bearing supporting said shaft and pressurized working fluid, comprising a labyrinth seal between the bearing and the source of pressurized working fluid and about the shaft, said labyrinth seal having an annular groove intermediate the ends of said labyrinth seal;

an outlet between the bearing and said labyrinth seal; and a control valve including a diaphragm, a first side of said diaphragm being in pressure communication with said annular groove and a second side of said diaphragm being in pressure communication with said outlet, bias means for biasing said diaphragm in the direction of said first side, a valve controlled by said diaphragm to selectively vent said outlet, an inlet passageway in communication with said outlet, an exhaust passageway from said system, a valve element controlling communication between said inlet passageway and said exhaust passageway and a valve stem coupled with said valve element and with said diaphragm.

8. The shaft seal of claim 7 wherein said valve element is constructed and arranged to provide a nonlinear response between valve element displacements and flow.

* * * * *